United States Patent
Kuroda et al.

(10) Patent No.: US 9,859,721 B2
(45) Date of Patent: Jan. 2, 2018

(54) STORAGE BATTERY MANAGEMENT DEVICE, METHOD, AND COMPUTER PROGRAM PRODUCT

(71) Applicant: KABUSHIKI KAISHA TOSHIBA, Minato-ku (JP)

(72) Inventors: Kazuto Kuroda, Arakawa (JP); Shinichiro Kosugi, Yokohama (JP); Masahiro Sekino, Shinjuku (JP); Jun Takahashi, Kunitachi (JP); Ryo Okabe, Hino (JP); Yusuke Kikuchi, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 128 days.

(21) Appl. No.: 14/771,962

(22) PCT Filed: Mar. 16, 2015

(86) PCT No.: PCT/JP2015/057765
§ 371 (c)(1),
(2) Date: Sep. 1, 2015

(87) PCT Pub. No.: WO2016/147306
PCT Pub. Date: Sep. 22, 2016

(65) Prior Publication Data
US 2016/0276846 A1    Sep. 22, 2016

(51) Int. Cl.
*H02J 17/00*   (2006.01)
*H02J 7/00*    (2006.01)
(Continued)

(52) U.S. Cl.
CPC ....... *H02J 7/0014* (2013.01); *H01M 10/4207* (2013.01); *H02J 7/0021* (2013.01); *H02J 3/32* (2013.01); *H02J 7/35* (2013.01)

(58) Field of Classification Search
USPC ........................................................ 320/112
See application file for complete search history.

(56) References Cited

U.S. PATENT DOCUMENTS 8,030,898 B2    10/2011  Okuto
2011/0127964 A1  6/2011  Nishida et al.
(Continued)

FOREIGN PATENT DOCUMENTS

JP    2003-289629 A    10/2003
JP    2009-124933 A     6/2009
(Continued)

OTHER PUBLICATIONS

International Search Report dated Apr. 21, 2015 in PCT/JP2015/057765 filed Mar. 16, 2015 (in Japanese).

*Primary Examiner* — Mohammed Alam
(74) *Attorney, Agent, or Firm* — Oblon, McClelland, Maier & Neustadt, L.L.P.

(57) ABSTRACT

A storage battery management device manages a plurality of battery units in a storage battery system including the battery units having a plurality of battery cells and a power adjustment device connected to the battery units via respective contactors and connected to a main circuit. The storage battery management device includes a minimum value determination unit and a controller. The minimum value determination unit, from the battery units in which a difference between a maximum cell voltage and a minimum cell voltage of the battery cells forming each of the battery units is equal to or less than a certain value, determines a minimum value of the minimum cell voltage. The controller controls a cell balance process of the battery unit managed by itself, by using the minimum value of the minimum cell voltage determined by the minimum value determination unit as a cell balance target voltage.

5 Claims, 4 Drawing Sheets

(51) Int. Cl.
*H01M 10/42* (2006.01)
*H02J 3/32* (2006.01)
*H02J 7/35* (2006.01)

(56) References Cited

U.S. PATENT DOCUMENTS

| | | | |
|---|---|---|---|
| 2011/0309795 A1* | 12/2011 | Firehammer | H02J 7/0014 320/118 |
| 2011/0309796 A1* | 12/2011 | Firehammer | H02J 7/0018 320/118 |
| 2012/0038212 A1 | 2/2012 | Arata et al. | |
| 2013/0187466 A1* | 7/2013 | Sakai | G01R 19/16542 307/52 |
| 2014/0175873 A1* | 6/2014 | Kishimoto | H01M 10/441 307/10.1 |

FOREIGN PATENT DOCUMENTS

| | | |
|---|---|---|
| JP | 2009-212020 | 9/2009 |
| JP | 2012-039821 A | 2/2012 |
| JP | 2013-179739 A | 9/2013 |
| JP | 2014-103804 A | 6/2014 |
| JP | 5675951 B2 | 2/2015 |
| WO | 2010/018644 A1 | 2/2010 |
| WO | 2012/114479 A1 | 8/2012 |

\* cited by examiner

STORAGE BATTERY MANAGEMENT DEVICE, METHOD, AND COMPUTER PROGRAM PRODUCT

CROSS-REFERENCE TO RELATED APPLICATIONS

This application is national stage application of International Application No. PCT/JP2015/057765, filed Mar. 16, 2015, which designates the United States, the entire contents of which are incorporated herein by reference.

FIELD

Embodiments described herein relate generally to a storage battery management device, a method, and a computer program product.

BACKGROUND

In recent years, safe and clean natural energy such as solar power generation and wind power generation has been introduced. However, the output of natural energy is not stable, and the mass introduction may negatively affect the voltage and frequency of power systems. If the supply of natural energy largely exceeds the power demand, the natural energy power generation systems need to be stopped, resulting in reduced utilization of power generation facilities.

To solve such problems, a large-scale storage battery system using secondary batteries is added to the power generation systems, and is expected to prevent output fluctuations of the natural energy by charging/discharging power to and from the storage batteries, and to store surplus power in the storage batteries.

In large-scale storage battery systems such as a storage battery system for power systems, the required storage battery capacity is obtained by configuring a storage battery device including a plurality of battery modules arranged in parallel, in which a plurality of battery cells are connected in series.

To adjust the cell balance of such a storage battery device, the voltage of a single battery cell having the lowest voltage in the storage battery device is used as a target voltage to adjust the voltage of other single battery cells.

However, for example, if abnormally low voltage occurs in a single battery cell forming a storage battery device, the voltage of all the cells can possibly be adjusted to the voltage of the abnormal cell.

The present invention has been made to solve the problem, and an object of the present invention is to provide a storage battery management device, a method, and a computer program capable of preventing an influence even if an abnormality occurs in a battery cell (or cell module) forming a battery unit, and providing enhanced utilization.

Patent Literature 1: Japanese Patent Application Laid-open No. 2013-179739
Patent Literature 2: Japanese Patent Application Laid-open No. 2009-124933
Patent Literature 3: Japanese Patent Application Laid-open No. 2009-212020

DETAILED DESCRIPTION

In general, according to an embodiment, a storage battery management device manages a plurality of battery units in a storage battery system including the battery units having a plurality of battery cells and a power adjustment device connected to the battery units via respective contactors and connected to a main circuit. The storage battery management device comprises a minimum value determination unit and a controller. The minimum value determination unit, from the battery units in which a difference between a maximum cell voltage and a minimum cell voltage of the battery cells forming each of the battery units is equal to or less than a certain value, determines a minimum value of the minimum cell voltage. The controller controls a cell balance process of the battery unit managed by itself, by using the minimum value of the minimum cell voltage determined by the minimum value determination unit as a cell balance target voltage.

An embodiment will now be described with reference to the accompanying drawings.

Figure 1:
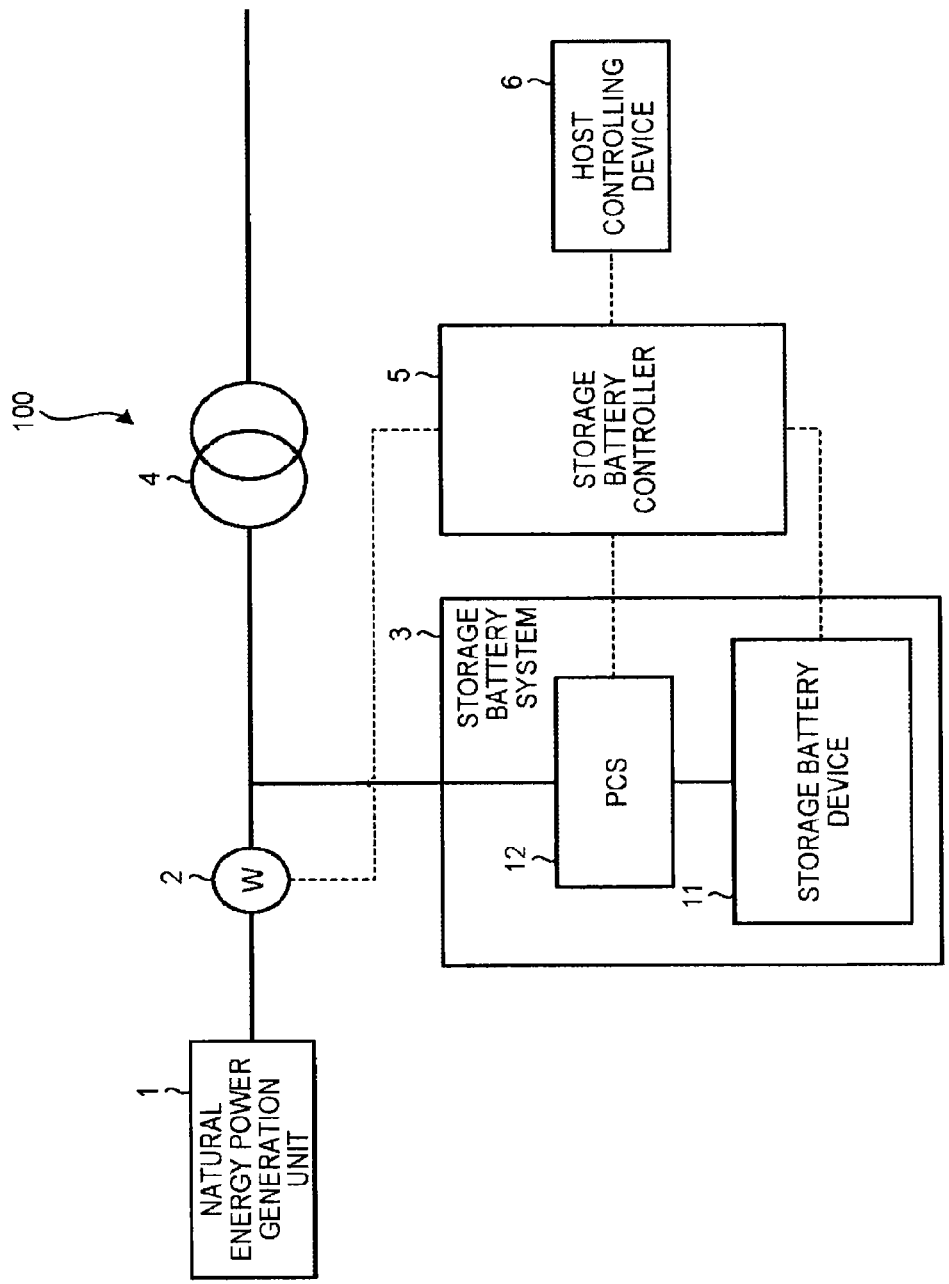
FIG. 1 is a schematic configuration diagram of a natural energy power generation system including a plurality of storage battery systems.

FIG. 1 is a schematic configuration diagram of a natural energy power generation system including a plurality of storage battery systems.

A natural energy power generation system 100 includes: a natural energy power generation unit 1 that functions as a power system, uses natural energy (renewable energy) such as solar light, hydraulic power, wind power, biomass, and geothermal, and is capable of outputting the energy as system power; a power meter 2 that measures the power generated by the natural energy power generation unit 1; a plurality of storage battery systems 3 that charge surplus power and discharge deficient power of the natural energy power generation unit 1 based on the measurement results by the power meter 2, and output the resulting power including superimposition of the charged or discharged power on the power generated by the natural energy power generation unit 1; a transformer 4 that converts the voltage of the power (including when the power output from the storage battery systems 3 includes superimposition) output from the natural energy power generation unit 1; a storage battery controller 5 that locally controls a storage battery system 3; and a host controlling device 6 that remotely controls the storage battery controller 5.

Figure 2:
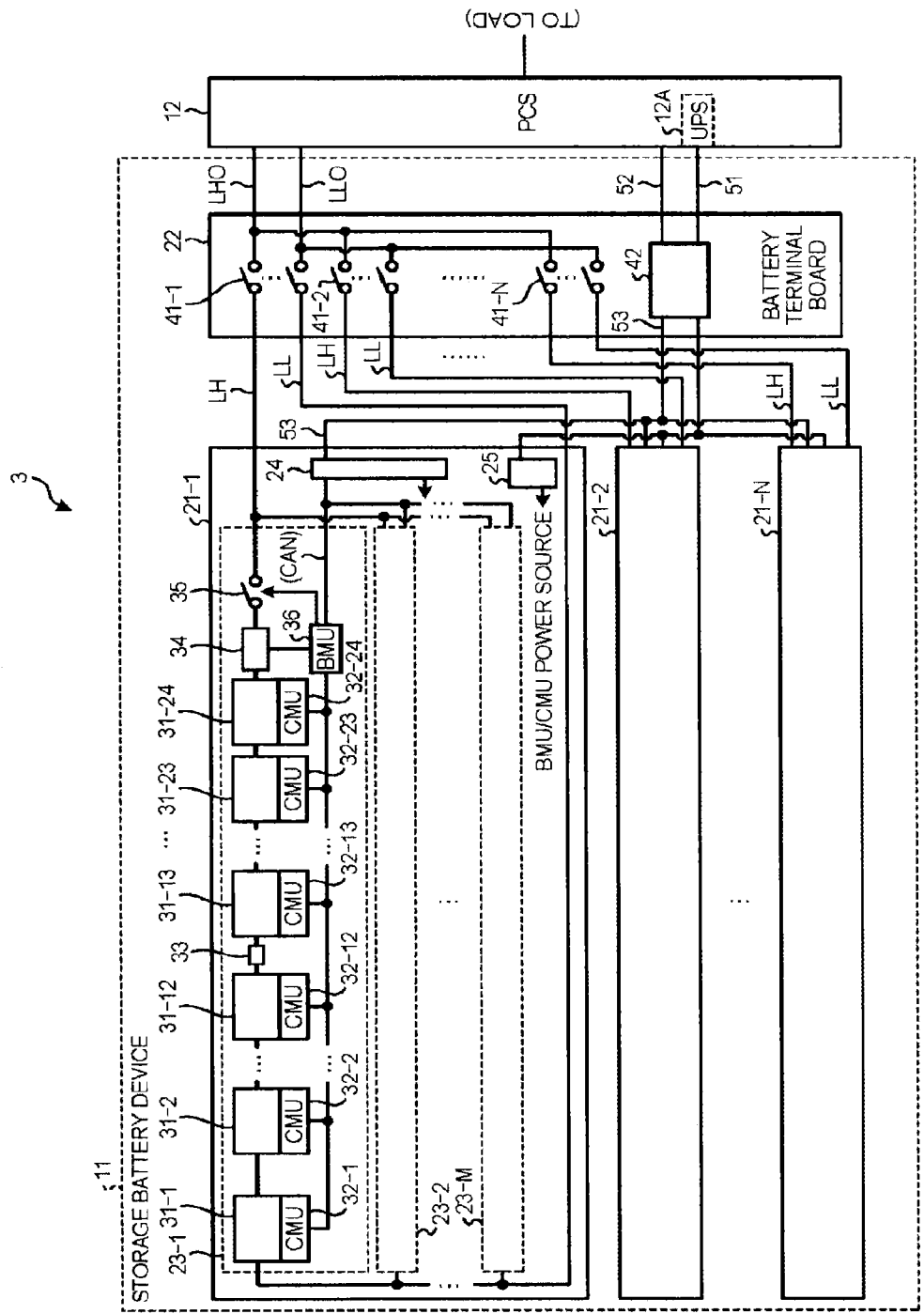
FIG. 2 is a schematic configuration block diagram of a storage battery system including a storage battery management device according to an embodiment.

FIG. 2 is a schematic configuration block diagram of a storage battery system including a storage battery management device according to the embodiment.

The storage battery system 3, when roughly classified, includes a storage battery device 11 that stores power therein and a power conditioning system (PCS) 12 that converts direct current power supplied from the storage battery device 11 to alternating current power having a desired power quality and supplies it to a load.

The storage battery device 11, when roughly classified, includes a plurality of battery boards 21-1 to 21-N (N being a natural number) and a battery terminal board 22 to which the battery boards 21-1 to 21-N are connected.

Each of the battery boards 21-1 to 21-N includes a plurality of battery units 23-1 to 23-M (M being a natural number) connected in parallel with each other, a gateway device 24, and a direct current power source device 25 that supplies direct current power to operate a battery management unit (BMU) and a cell monitoring unit (CMU), which will be described later. Herein, the BMU corresponds to the storage battery management device.

A configuration of a battery unit will now be described.

Each of the battery units 23-1 to 23-M is connected to output power lines (bus) LHO and LLO via a high potential side power supply line LH and a low potential side power supply line LL, and supplies power to the PCS 12, which is a main circuit.

Because the battery units 23-1 to 23-M have the same configuration, the battery unit 23-1 is explained as an example.

The battery unit 23-1, when roughly classified, includes a plurality (24 in FIG. 2) of cell modules 31-1 to 31-24, a plurality (24 in FIG. 2) of CMUs 32-1 to 32-24 provided respectively to the cell modules 31-1 to 31-24, a service disconnect 33 provided between the cell module 31-12 and the cell module 31-13, a current sensor 34, and a contactor 35. The cell modules 31-1 to 31-24, the service disconnect 33, the current sensor 34, and the contactor 35 are connected in series.

The cell modules 31-1 to 31-24 configure a battery pack by connecting a plurality of battery cells in series and in parallel. The cell modules 31-1 to 31-24 connected in series configure a battery pack group.

The battery unit 23-1 also includes a BMU 36. The communication line of each of the CMUs 32-1 to 32-24 and the output line of the current sensor 34 are connected to the EMU 36.

The BMU 36 controls the entire battery unit 23-1 under the control of the gateway device 24, and controls the opening and closing of the contactor 35 based on the communication results (voltage data and temperature data, which will be described later) with each of the CMUs 32-1 to 32-24 and the detection result of the current sensor 34.

The configuration of the battery terminal board 22 will now be described.

The battery terminal board 22 includes a plurality of board breakers 41-1 to 41-N provided corresponding to the battery boards 21-1 to 21-N and a master device 42 configured as a microcomputer that controls the entire storage battery device 11.

The master device 42 is connected to the PCS 12 through a control power line 51 supplied via an uninterruptible power system (UPS) 12A of the PCS 12 and a control communication line 52 configured as an Ethernet (registered trademark) and with which the BMU 36 and the PCS 12 directly exchange control data by functioning as a communication bus. The master device 42 is also connected to a communication line 53 electrically connected to the control communication line 52 and with which data is exchanged directly with another BMU 36 by functioning as a communication bus.

Detailed configurations of the cell modules 31-1 to 31-24, the CMUs 32-1 to 32-24, and the BMU 36 will now be described.

Figure 3:
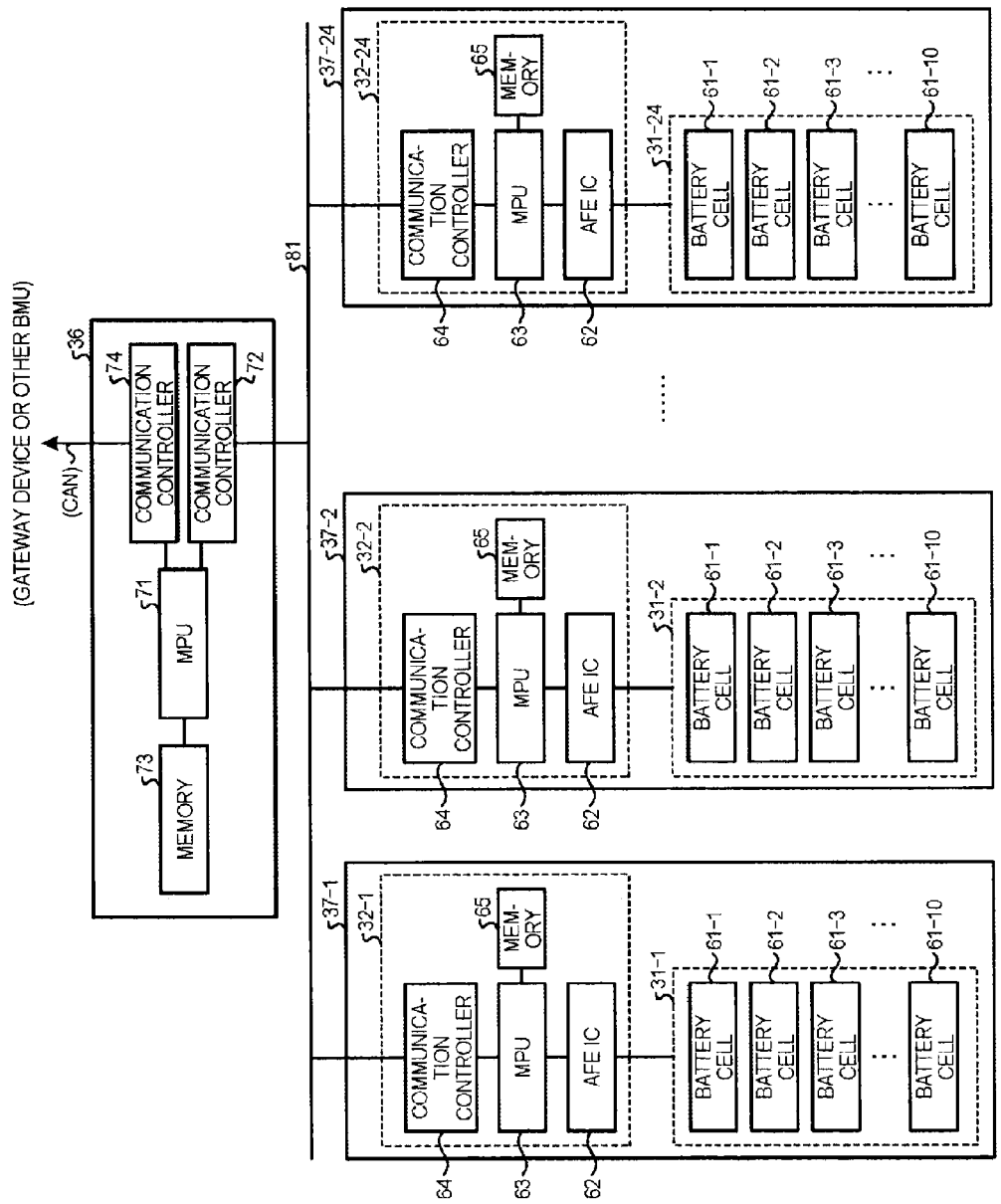
FIG. 3 is a detailed configuration diagram for explaining a cell module, a CMU, and a BMU.

FIG. 3 is a detailed configuration diagram for explaining a cell module, a CMU, and a BMU.

Each of the cell modules 31-1 to 31-24 includes a plurality (10 in FIG. 3) of battery cells 61-1 to 61-10 connected in series.

Each of the CMUs 32-1 to 32-24 includes an analog front end IC (AFE-IC) 62 used for measuring the voltage of the battery cells configuring the corresponding cell modules 31-1 to 31-24 and the temperature of a certain location, a microprocessor unit (MPU) 63 that controls the entire corresponding CMUs 32-1 to 32-24, a communication controller 64 in compliance with the Controller Area Network (CAN) standard so as to perform the CAN communication with the BMU 36, and a memory 65 that stores therein voltage data corresponding to the voltage of each cell as well as temperature data.

In the following explanation, the configuration that combines each of the cell modules 31-1 to 31-24 and the corresponding CMUs 32-1 to 32-24 is referred to as battery modules 37-1 to 37-24. For example, a configuration that combines the cell module 31-1 and the corresponding CMU 32-1 is referred to as a battery module 37-1.

The BMU 36 includes an MPU 71 that controls the entire EMU 36, a communication controller 72 in compliance with the CAN standard so as to perform the CAN communication with the CMUs 32-1 to 32-24, a memory 73 that stores therein voltage data and temperature data transmitted from the CMUs 32-1 to 32-24, and a communication controller 74 in compliance with the CAN standard so as to perform the CAN communication with the gateway device 24 or the BMU 36 of the battery units 23-2 to 23-M.

The storage battery controller 5 detects the power generated by the natural energy power generation unit 1, and to ease the influence of the generated power on the power system, suppresses the output fluctuation of the generated power by using the storage battery device 11. The fluctuation suppression amount relative to the storage battery device 11 is calculated by the storage battery controller 5 or the host controlling device 6, and applied to the PCS 12 corresponding to the storage battery device 11 as a charge/discharge command.

An operation of executing the cell balance in the storage battery device 11 will now be described.

In the following example, the BMU 36 of the battery unit 23-1 actually performs a determination operation for executing the cell balance, when the determination operation for executing the cell balance of the storage battery device 11 is performed by the battery unit 23-1.

Figure 4:
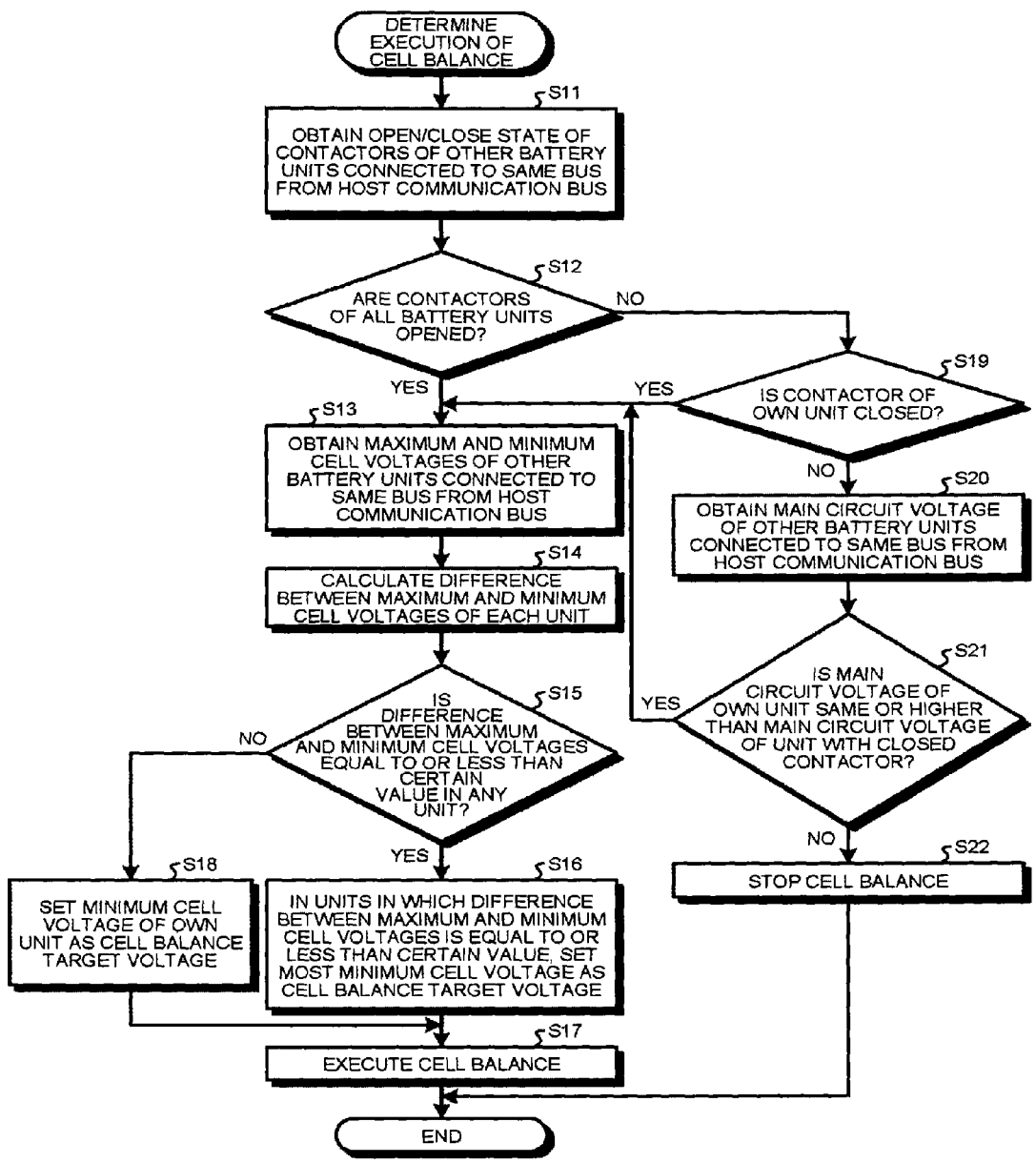
FIG. 4 is a process flowchart illustrating a determination operation for executing a cell balance according to the embodiment.

FIG. 4 is a process flowchart illustrating a determination operation for executing a cell balance according to the embodiment.

The BMU 36 of the battery unit 23-1 obtains, via the communication controller 74 and the host communication bus (CAN) connected to the gateway device 24 or the BMU 36 of the battery units 23-2 to 23-M, the opened or closed state of the contactors 35 of the other battery units 23-2 to 23-M connected to the host communication bus (S11).

The BMU 36 of the battery unit 23-1 then determines whether the contactors 35 of all the battery units 23-1 to 23-M is opened (S12).

At S12, if the contactors 35 of all the battery units 23-1 to 23-M are opened (Yes at S12), the BMU 36 of the battery unit 23-1 obtains the maximum cell voltage (maximum cell module voltage) and the minimum cell voltage (minimum cell module voltage) from the cell modules 31-1 to 31-24 configuring the other battery units 23-2 to 23-M connected to the host communication bus (S13).

The BMU 36 of the battery unit 23-1 then calculates the difference between the maximum cell voltage and the minimum cell voltage (differential voltage) of each of the battery units 23-2 to 23-M (S14).

The BMU 36 of the battery unit 23-1 then determines whether the difference between the maximum cell voltage and the minimum cell voltage is equal to or less than a certain value, in any of the battery units 23-2 to 23-M (S15).

At S15, if the difference between the maximum cell voltage and the minimum cell voltage is equal to or less than a certain value in any of the other battery units 23-2 to 23-M (Yes at S15), the BMU 36 of the battery unit 23-1 functions as a minimum value determination unit and a controller, and from the battery units in which the difference between the maximum cell voltage and the minimum cell voltage is equal to or less than a certain value in the battery unit, sets the most minimum cell voltage as a cell balance target voltage (S16). The process then proceeds to S17.

At S15, if the difference between the maximum cell voltage and the minimum cell voltage is not equal to or less than a certain value in any of the battery units 23-2 to 23-M (No at S15), in other words, if the difference between the maximum cell voltage and the minimum cell voltage is above a certain value, the BMU 36 of the battery unit 23-1 sets the minimum cell voltage of the battery unit 23-1 as a cell balance target voltage (S18).

This is because, if the difference between the maximum cell voltage and the minimum cell voltage is above a certain value, some battery unit may have a failure of some kind. Thus, this is to avoid setting a cell balance target voltage accordingly.

The above explanation is a cell balance process performed only during normal operation and when the difference between the maximum cell voltage and the minimum cell voltage is above a certain value due to maintenance and the like, it is possible to set a cell balance target voltage accordingly by giving a clear instruction to the BMU 36 of the battery unit 23-1.

The BMU 36 of the battery unit 23-1 then executes the cell balance process according to the cell balance target voltage and finishes the process (S17).

At S12, if the contactors 35 of not all the battery units 23-1 to 23-M are opened (No at S12), in other words, if the contactor 35 of a part of the battery units is closed, the BMU 36 of the battery unit 23-1 obtains the main circuit voltage of the other battery units 23-2 to 23-M connected to the host communication bus (S20).

The BMU 36 of the battery unit 23-1 then compares the main circuit voltage of the other battery units in which the contactor 35 is closed and the main circuit voltage of the battery unit 23-1, and determines whether the main circuit voltage of the battery unit 23-1 (local battery unit) is the same or higher (S21).

At S21, if the main circuit voltage of the other battery units in which the contactor 35 is closed is the same or higher than the main circuit voltage of the battery unit 23-1 (Yes at S21), the process proceeds to S13 again to continue the same process.

If the main circuit voltage of the other battery units in which the contactor 35 is closed is lower than the main circuit voltage of the battery unit 23-1 (No at S21), the BMU 36 of the battery unit 23-1 finishes the process without performing the cell balance process.

This is because, if the voltage of the battery unit 23-1 diverges excessively from that of the other battery units 23-2 to 23-M, the contactor 35 may become unclosable. This is to prevent such things.

As described above, according to the present embodiment, it is possible to prevent the cell balance process being performed by referring to the voltage of a battery cell in an abnormal state. Even if an abnormality occurs in a battery cell (or cell module) configuring the storage battery device 11, it is possible to prevent the influence and to enhance the utilization of the storage battery system 3.

A computer program executed in the storage battery management device according to the present embodiment is provided by being recorded in a computer-readable memory medium such as a compact disc read-only memory (CD-ROM), a flexible disk (FD), a compact-disc recordable (CD-R), a digital versatile disc (DVD) in a file of an installable form or an executable form.

The computer program executed in the storage battery management device according to the present embodiment may be stored on a computer connected to a network such as the Internet, and provided by causing a user to download it via the network. The computer program executed in the storage battery management device according to the present embodiment may also be provided or distributed via a network such as the Internet.

The computer program of the storage battery management device according to the present embodiment can also be provided by being incorporated in a read-only memory (ROM) or the like in advance.

The computer program executed in the storage battery management device according to the present embodiment is composed of a modular configuration including respective units (minimum value determination unit and controller) described above, and as actual hardware, the CPU (processor) reads out the computer program from the recording medium described above and executes the computer program, thereby loading the respective units on the main memory device, and the minimum value determination unit and the controller are generated on the main memory device.

Some exemplary embodiments of the present invention have been described but such embodiments are not meant to limit the scope of the invention. These new embodiments may be carried out in various other modes, and various omissions, replacements, and modifications are possible without departing from the spirit of the invention. These embodiments and the modifications fall within the scope and spirit of the invention, and also within the invention described in the accompanying claims and their equivalents.

The invention claimed is:

1. A storage battery management device to be provided in a battery unit in a storage battery system, to manage the battery unit, the storage battery system comprising battery units and a power adjustment device connected to the battery units via respective contactors and connected to a main circuit, the battery units each including battery cells and the storage battery management device, the storage battery management device comprising:

a minimum value determination unit that acquires a maximum cell voltage and a minimum cell voltage of the battery cells of each of the battery units, and determines a minimum value from the minimum cell voltage of one of the battery units which exhibits a difference equal to or less than a certain value between a maximum cell voltage and a minimum cell voltage; and a controller that sets the minimum value of the minimum cell voltage determined by the minimum value determination unit as a cell balance target voltage, and controls a voltage of the battery cells of the battery unit to match the cell balance target voltage.

2. The storage battery management device according to claim 1, wherein the battery units are connected to the power adjustment device via a communication bus, and the controller sets the minimum cell voltage of the battery cells of the managing battery unit as the cell balance target voltage, and controls the voltage of the battery cells of the managing battery unit to match the cell balance target voltage, in a case where all the differences between the maximum cell voltages and the minimum cell voltages of the battery cells of the battery units are above a certain value.

3. The storage battery management device according to claim 2, wherein
the minimum value determination unit acquires the maximum cell voltages and the minimum cell voltages from the other battery units via the communication bus.

4. A method executed by a storage battery management device to be provided in a battery unit in a storage battery system, to manage the battery unit, the storage battery system comprising battery units and a power adjustment device connected to the battery units via respective contactors and connected to a main circuit, the battery units each including battery cells and the storage battery management device, the method comprising:
acquiring a maximum cell voltage and a minimum cell voltage of the battery cells of each of the battery units, and determining a minimum value from the minimum cell voltage of one of the battery units which exhibits a difference equal to or less than a certain value between a maximum cell voltage and a minimum cell voltage; and
setting the determined minimum value of the minimum cell voltage as a cell balance target voltage, and controlling a voltage of the battery cells of the battery unit to match the cell balance target voltage.

5. A computer program product including programmed instructions embodied in and stored on a non-transitory computer readable medium, wherein the instructions for controlling a storage battery management device to be provided in a battery unit, in a storage battery system, to manage the battery unit, the storage battery system comprising battery units and a power adjustment device connected to the battery units via respective contactors and connected to a main circuit, the battery units each including battery cells and the storage battery management device, when executed by a computer, cause the computer to perform:
acquiring a maximum cell voltage and a minimum cell voltage of the battery cells of each of the battery units, and determining a minimum value from the minimum cell voltage of one of the battery units which exhibits a difference equal to or less than a certain value between a maximum cell voltage and a minimum cell voltage; and
setting the determined minimum value of the minimum cell voltage as a cell balance target voltage, and controlling a voltage of the battery cells of the battery unit to match the cell balance target voltage.

* * * * *